(12) United States Patent
Bushida et al.

(10) Patent No.: US 9,902,547 B2
(45) Date of Patent: Feb. 27, 2018

(54) CONTAINER

(71) Applicants: SUNTORY BEVERAGE & FOOD LIMITED, Tokyo (JP); SUNTORY HOLDINGS LIMITED, Osaka (JP)

(72) Inventors: Mitsuru Bushida, Tokyo (JP); Daisuke Tanaka, Tokyo (JP); Takashi Kado, Tokyo (JP); Hiroki Yokoyama, Tokyo (JP); Masayuki Kitamasu, Tokyo (JP)

(73) Assignees: SUNTORY BEVERAGE & FOOD LIMITED, Tokyo (JP); SUNTORY HOLDINGS LIMITED, Osaka (JP)

( * ) Notice: Subject to any disclaimer, the term of this patent is extended or adjusted under 35 U.S.C. 154(b) by 68 days.

(21) Appl. No.: 14/902,119

(22) PCT Filed: Jun. 27, 2014

(86) PCT No.: PCT/JP2014/067246
§ 371 (c)(1),
(2) Date: Dec. 30, 2015

(87) PCT Pub. No.: WO2015/002101
PCT Pub. Date: Jan. 8, 2015

(65) Prior Publication Data
US 2016/0368688 A1 Dec. 22, 2016

(30) Foreign Application Priority Data
Jul. 1, 2013 (JP) ................................. 2013-138352

(51) Int. Cl.
*B65D 81/32* (2006.01)
*A47J 31/40* (2006.01)
(Continued)

(52) U.S. Cl.
CPC ...... *B65D 77/2036* (2013.01); *B01F 13/0022* (2013.01); *B65D 1/26* (2013.01);
(Continued)

(58) Field of Classification Search
CPC ... A47J 31/407; B65D 75/5822; B65D 75/32; B65D 1/26; B65D 1/32; B65D 1/42;
(Continued)

(56) References Cited

U.S. PATENT DOCUMENTS 4,158,376 A * 6/1979 Erb ..................... B65D 1/0292
220/666
4,301,923 A * 11/1981 Vuorento ........... B65D 75/5822
206/484

(Continued)

FOREIGN PATENT DOCUMENTS

FR 2652061 3/1991
JP 2007-525385 9/2007
(Continued)

OTHER PUBLICATIONS

U.S. Appl. No. 14/902,088 to Mitsuru Bushida et al., filed Dec. 30, 2015.
(Continued)

*Primary Examiner* — J. Gregory Pickett
*Assistant Examiner* — Gideon Weinerth
(74) *Attorney, Agent, or Firm* — Greenblum & Bernstein, P.L.C.

(57) ABSTRACT

Provided is a container with which its body can be deformed with a same external force until most of the contents has been discharged from the container body and to cause the final shape after the deformation to be a constant shape. Also provided is a container with which the contents discharged can be rendered constant, thus making it possible to obtain a diluted product having a constant concentration. The container includes a bottomed container body and a lid member, the container body and the lid member being sealed by an annular seal portion. There is provided a detaching seal portion which is detached in response to increase of (Continued)

pressure inside the container body associated with deformation of the container body. There is also provided a deformation controlling recess whose width is progressively reduced from a back face side of the flange toward the bottom face side.

6 Claims, 6 Drawing Sheets

(51) Int. Cl.
*B65D 21/08* (2006.01)
*B65D 1/32* (2006.01)
*B65D 77/20* (2006.01)
*B65D 1/26* (2006.01)
*B65D 1/40* (2006.01)
*B01F 13/00* (2006.01)
*B65D 1/42* (2006.01)

(52) U.S. Cl.
CPC ............. *B65D 1/40* (2013.01); *B65D 1/42* (2013.01); *A47J 31/407* (2013.01); *B01F 2215/0022* (2013.01); *B65D 2231/005* (2013.01); *B65D 2575/366* (2013.01); *B65D 2577/2066* (2013.01)

(58) Field of Classification Search
CPC ............. B65D 77/2036; B65D 77/2064; B65D 85/8043; B65D 2577/2066; B65D 83/0094; B65D 2575/366; B65D 77/36; B65D 1/0292; B65D 21/086; B65D 21/068; B65D 83/0055; B65D 83/0072; B65D 83/0022; B01F 3/088; B01F 15/0087; B01F 2003/0896; B67D 7/0216
USPC ....... 220/281, 666, 276, 359, 359.2; 156/69, 156/581; 222/541.4, 95, 96, 107, 541.3, 222/491; 206/469, 484, 631, 219, 604; 99/295, 323.3; 53/133.1, 412; 426/77, 426/110, 111, 112; 229/123.1, 125.35
See application file for complete search history.

(56) References Cited

U.S. PATENT DOCUMENTS

| | | | | |
|---|---|---|---|---|
| 4,770,295 A * | 9/1988 | Carveth | ............ | B29C 66/72343 156/273.7 |
| 4,913,307 A * | 4/1990 | Takata | ............ | B29C 65/18 156/69 |
| 4,961,302 A * | 10/1990 | Davis | ............ | B29C 65/18 156/583.1 |
| 4,961,513 A * | 10/1990 | Gossedge | ............ | B29C 65/18 156/69 |
| 4,969,965 A * | 11/1990 | Matty | ............ | B29C 65/18 156/220 |
| 4,978,055 A * | 12/1990 | Miller | ............ | A45C 11/24 150/146 |
| 5,141,594 A * | 8/1992 | Walter | ............ | B29C 65/18 156/581 |
| 5,164,208 A * | 11/1992 | Thomas, Jr. | ............ | B29C 65/18 156/581 |
| 5,546,728 A * | 8/1996 | Dekeyser | ............ | B65D 75/366 222/107 |
| 6,540,855 B1 * | 4/2003 | Holmberg | ............ | B29C 65/02 156/292 |
| 6,843,042 B2 * | 1/2005 | Nakabayashi | ............ | B29C 65/02 156/69 |
| 8,608,895 B2 * | 12/2013 | Sato | ............ | B29C 65/18 156/292 |
| 8,784,915 B2 * | 7/2014 | Evers | ............ | A47J 31/407 220/203.08 |
| 8,857,663 B2 * | 10/2014 | Scholvinck | ............ | B65D 77/2036 206/469 |
| 9,023,411 B2 * | 5/2015 | Maatta | ............ | B65D 77/2024 206/497 |
| D757,540 S * | 5/2016 | Bushida | ............ | B65D 77/2064 D9/434 |
| 2002/0119221 A1 * | 8/2002 | Matsukura | ............ | A23G 9/28 426/115 |
| 2008/0148948 A1 | 6/2008 | Evers et al. | | |
| 2008/0230571 A1 | 9/2008 | Sterngold et al. | | |
| 2009/0202684 A1 * | 8/2009 | Willemsen | ............ | B65D 1/32 426/110 |
| 2010/0326283 A1 | 12/2010 | Evers et al. | | |
| 2011/0142996 A1 * | 6/2011 | Kruger | ............ | B65B 29/022 426/80 |
| 2012/0241455 A1 | 9/2012 | Schoelvinck et al. | | |
| 2012/0260806 A1 * | 10/2012 | Rolfes | ............ | A47J 31/38 99/285 |
| 2012/0318801 A1 * | 12/2012 | Wolters | ............ | B65D 77/2032 220/359.2 |
| 2013/0084367 A1 | 4/2013 | Caldwell et al. | | |
| 2014/0263375 A1 * | 9/2014 | Willemsen | ............ | B65D 1/32 220/666 |
| 2015/0245733 A1 * | 9/2015 | Castellani | ............ | A47J 31/0673 426/112 |
| 2015/0353273 A1 * | 12/2015 | Negus | ............ | B65D 77/2064 220/265 |
| 2016/0145026 A1 * | 5/2016 | Bushida | ............ | A47J 31/41 220/281 |
| 2016/0368651 A1 * | 12/2016 | Bushida | ............ | B65D 77/2036 |
| 2016/0368685 A1 * | 12/2016 | Bushida | ............ | B65D 77/2036 |
| 2016/0368686 A1 * | 12/2016 | Bushida | ............ | A47J 31/407 |
| 2016/0368687 A1 * | 12/2016 | Bushida | ............ | B65D 77/2028 |
| 2016/0368688 A1 * | 12/2016 | Bushida | ............ | B65D 77/2036 |
| 2016/0368690 A1 * | 12/2016 | Yokoyama | ............ | B65D 77/003 |

FOREIGN PATENT DOCUMENTS

| | | |
|---|---|---|
| JP | 2009-520644 | 5/2009 |
| JP | 2012-135518 | 7/2012 |
| WO | 2007/145525 | 12/2007 |
| WO | 2012/090743 | 7/2012 |
| WO | 2012/134285 | 10/2012 |

OTHER PUBLICATIONS

U.S. Appl. No. 14/902,082 to Mitsuru Bushida et al., filed Dec. 30, 2015.
U.S. Appl. No. 14/902,116 to Mitsuru Bushida et al., filed Dec. 30, 2015.
U.S. Appl. No. 14/902,077 to Mitsuru Bushida et al., filed Dec. 30, 2015.
U.S. Appl. No. 14/902,109 to Mitsuru Bushida et al., filed Dec. 30, 2015.
International Search Report issued in PCT/JP2014/067246, dated Sep. 30, 2014.
English Language Machine Translation of JP2012-135518.
International Preliminary Report on Patentability for PCT/JP2014/067246, dated Jan. 5, 2016.
Search Report issued in European Patent Office (EPO) Patent Application No. 14820352.4, dated Mar. 29, 2017.

* cited by examiner

CONTAINER

TECHNICAL FIELD

The present invention relates to a container including a bottomed container body holding contents therein and a lid member for closing an opening of the container body, the container body and the lid member being sealed with each other by an annular seal portion formed along a flanged face of the opening, a portion of the annular seal portion being detached in response to increase of pressure inside the container body associated with deformation of the container body resulting from application of an external force to a bottom face of the container body.

BACKGROUND ART

Patent Document 1 identified below exists as an example of background art information relating to this type of container. In the case of the container disclosed in this Patent Document 1, when the bottom face of the container is pressed from above with the container under a posture of orienting the lid member downwards being set to a bottom portion of a setting space present upwardly of a dilution bottle, the pressure inside the container body increases to cause detachment of a portion of the annular seal portion from the flanged face, whereby the contents are discharged into the dilution bottle.

Therefore, if a liquid of concentrated beverage ingredient is used as the contents of the container, beverage of an appropriate concentration can be obtained by introducing water or the like into the dilution bottle.

BACKGROUND ART DOCUMENT

Patent Document

Patent Document 1: Japanese Unexamined Patent Application Publication No. 2012-135518 (paragraph [0017], paragraph [0021], FIG. 1).

SUMMARY

Problem to be Solved by Invention

However, with the container disclosed in Patent Document 1, there was a tendency that the external force required for deforming the container body is not necessarily constant. Further, with the container disclosed in Patent Document 1, the shape obtained eventually after the deformation for the side wall portion of the container body would tend to differ for each use. As a result, the amount of contents discharged eventually from the container too would vary, so that it was difficult to discharge a constant amount and to obtain a constant concentration for a mixture obtained Then, an object of the present invention is, in view of the problem posed by the background art cited above, to provide a container with which its container body can be deformed with a constantly approximately same external force until most of the contents has been discharged from the container body and it is possible to cause readily the final shape after the deformation to be a constant shape.

A further object of the present invention is, in view of the problem posed by the background art cited above, to provide a container with which the amount of contents discharged eventually from the container can be rendered constant, thus making it possible to obtain a diluted product having a constant concentration.

Solution

According to a characterizing feature of a container relating to the present invention, the container comprises:

a bottomed container body holding contents therein and a lid member for closing an opening of the container body, the container body and the lid member being sealed with each other by an annular seal portion formed along a flanged face of the opening;

wherein at a specified portion of the annular seal portion, there is provided a detaching seal portion which is detached in response to increase of pressure inside the container body associated with deformation of the container body based on an external force received from a bottom face of the container body; and at a portion of a side wall portion of the container body, there is provided a deformation controlling recess whose width is progressively reduced from a back face side of the flanged face toward the bottom face side.

With the container having the above-described characterizing feature, when the bottomed container body is deformed by an external force received from the bottom face of the container body, a portion in the side wall portion where collapsing deformation starts will always be located at an end portion of the deformation controlling recess offset toward the bottom face. Therefore, when the volume of the container body is gradually reduced thereafter with continued application of the same external force and most of the contents is discharged eventually therefrom, the process of subsequent collapsing deformation occurring in the side wall portion of the container body and the shape obtained eventually after the deformation also can be readily made constant. As a result, it has become possible to always deform the container body with a relatively small and substantially constant external force. Further, since the amount of contents discharged eventually from the container too is made constant, there has been achieved the advantage of mixture having a constant concentration being readily obtained invariably.

Moreover, since the collapsing deformation occurs first at the portion offset toward the bottom face, there has been achieved a further advantage that the deformed side wall portion will hardly approach the back face of the lid member. As a result, the contents can be discharged smoothly without being interfered by the deformed side wall portion, so that it has become possible to significantly reduce the amount of contents to remain inside the container.

Incidentally, with the container having the above-described characterizing feature, when the container body receives an external force from the bottom face, the stress tends to be concentrated at the end portion of this deformation controlling recess which portion has smallest width and is offset towards the bottom face, so it is readily possible to cause this end portion of the deformation controlling recess offset towards the bottom face to serve as the start point of the collapsing deformation.

According to a further characterizing feature of the present invention, the side wall portion comprises a cylindrical body whose diameter is progressively reduced toward the bottom face.

With the above-described charactering feature, when the collapse of the side wall portion progresses with application of the external force, the portion of the side wall portion near the bottom face can readily be folded into a compact and neat constant shape with this portion advancing annularly to the radial inner side of a portion distant from the bottom face. As a result, it has become possible to cause the container body to be deformed with an even more constant and smaller external force. Further, it has become also possible to render the amount of contents discharged eventually from the container body even more constant.

Moreover, with the above-described characterizing feature, the portion of the side wall portion advancing to the radial inner side of the portion of the side wall portion distant from the bottom face will advance in an annular form not contacting the inner face of the base end portion. Therefore, even if this portion reaches the back face of the lid member, this will hardly cause an inconvenient situation of contents remaining between this portion and the inner face of the base end portion.

According to a still further characterizing feature of the present invention, the side wall portion includes a base end portion extending from the back face of the flanged face towards the bottom face, a leading end portion extending from the bottom face towards the back face, and an intermediate portion interconnecting the base end portion and the leading end portion and more deformable by the external force than the leading end portion and the base end portion; and the deformation controlling recess extends at least from a portion of the intermediate portion to vicinity of boundary between the intermediate portion and the leading end portion.

With the above-described characterizing feature, since the deformation controlling recess is provided at the intermediate portion readily deformable by an external force, at the time of deformation of the container body by an external force received from the bottom face, the collapse will start with an even smaller external force and also the tendency of the bottom-face side end portion of the side wall portion becoming the starting point of collapsing deformation will be further increased. Moreover, also when the collapse of the side wall portion progresses, an even smaller external force can provide the state of a portion of the intermediate portion advancing linearly to the radial inner side of the base end portion.

According to a still further characterizing feature of the present invention, the base end portion includes a base end sunk portion extending from the back face of the flanged face toward the bottom portion; and the deformation controlling recess extends continuously from a lower end of the base end sunk portion towards the bottom portion.

With the above-described characterizing feature, as the base end portion includes a base end sunk portion extending from the back face of the flanged face toward the bottom portion, there is obtained a higher rigidity against the external force received from the bottom face of the container body. Therefore, the tendency of collapsing deformation occurring at the portion nearer the bottom face than the base end portion prior to the base end portion will be increased and the process of the collapsing deformation experienced sequentially by the side wall portion of the container body and the shape obtained eventually after the deformation will be made even more constant easily.

According to a still further characterizing feature of the present invention, the annular seal portion includes a reverse-oriented annular seal portion projecting toward the radial inner side of the opening; and the reverse-oriented annular seal portion extends along a region in the flanged face which corresponds to a radial outer side of an upper end of the base end sunk portion.

With the above-described characterizing feature, when the detaching seal portion is detached by increase of the inside pressure inside the container body, the inside pressure will be concentrated at the reverse-oriented annular seal portion projecting to the radial inner side, so detachment occurs at this reverse-oriented annular seal portion before detachment occurs at the other portion. Therefore, a user can know in advance and with high precision from which part of the opening the contents will be discharged. Consequently, the amount of the contents to remain inside the container in the end can be reduced sufficiently.

Moreover, since the reverse-oriented annular seal portion extends along a region in the flanged face which corresponds to a radial outer side of an upper end of the base end sunk portion, the rigidness of the container body against an external force received from the bottom face is enhanced in particular at the portion of the base end portion corresponding to the reverse-oriented annular seal portion, so that the deformed side wall portion will approach the back face of the lid member even less likely. As a result, the contents can be readily discharged along the back face of the lid member in an even more smooth manner.

According to a still further characterizing feature of the present invention, the deformation controlling recess comprises a sloped sunk portion which is displaced to one side in the circumferential direction from the back face side of the flanged face towards the bottom face side.

Respecting the shape of the deformation controlling recess, even if it is provided e.g. in the form of extending linearly generally along the generating line of the side wall with a progressively reduced width from the end portion of the base end sunk portion towards the bottom face, when subject to application of an external force from the bottom face of the container body, there can be obtained the tendency of the bottom-face side end portion of the deformation controlling recess acting as the starting point of collapsing deformation. Yet, if it is provided in the form of a sloped sunk portion which is displaced to one side in the circumferential direction from the back face side of the flanged face towards the bottom face side as provided in the above-described characterizing feature, the tendency of the collapsing deformation starting from the bottom-face side end portion of the deformation controlling recess by an external force received from the bottom face of the container body will increase.

Moreover, if it is provided in the form of a sloped sunk portion which is displaced to one side in the circumferential direction from the back face side of the flanged face towards the bottom face side as provided in the above-described characterizing feature, as compared with a case of forming the deformation controlling portion extending linearly generally along the generating line of the side wall portion, the collapsing deformation started at the bottom-face side end portion of the deformation controlling recess gradually moves towards the back face of the flanged face, so the collapsing deformation of the side wall portion can proceed smoothly.

EMBODIMENTS

Next, embodiments of the present invention will be described with reference to the accompanying drawings.

General Configuration of Portion Container

Figure 1:
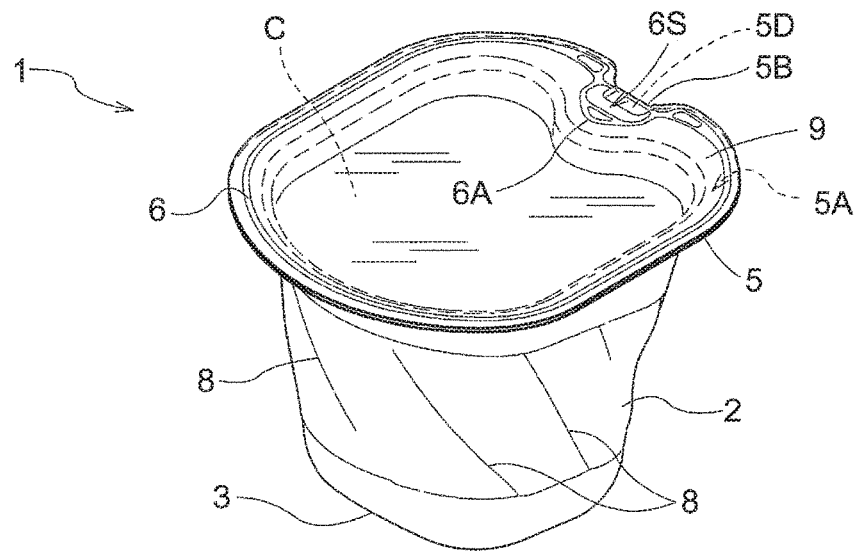
FIG. 1 is a perspective view showing appearance of a container.

FIG. 1 shows a portion container 1 as an example of "container" relating to the present invention. This portion container 1 includes a container body 2 formed of resin and holding an amount of contents C in form of e.g. liquid therein and having a bottom and a lid member 9 formed of resin and configured to close an opening of the container body 2 in a sealing manner. At least a portion of the container body 2 is configured to be easily deformable by an external force.

The container body 2 and the lid member 9 are originally sealed with each other via an annular seal portion 6 formed annularly along a flanged face 5A of a flange 5 extending radially outwards from the opening of the container body 2. In response to a pressing pressure applied to e.g. a bottom face 3 of the container body 2, a portion of the container body 2 will be deformed in such a manner to reduce the inside volume of this container body 2. Then, when the pressure inside the container body 2 rises to reach a critical value, exfoliation (an example of "detachment") of the lid member 9 from the flanged face 5A occurs at a portion of the annular seal portion 6, thus effecting unsealing of the container.

Incidentally, even when some air is present in the container body 2 together with the contents C, if the unsealing is effected under a state of reverse-orienting the portion container 1 with the lid member 9 disposed downwards, the contents C, rather than the air, will be charged first.

At a specified position in the annular seal portion 6, there is provided a detaching seal portion 6S, 6R which can be detached more easily by increase of the inside pressure of the container body 2 than the remaining portion of the annular seal portion 6. Therefore, the above ensures that the position of the lid member 9 to be detached from the flanged face 5A with the increased inside pressure of the container body 2 will always be present at the position of this detaching seal portion 6S, so that the user can readily anticipate the advancing or discharging direction of the discharged contents C.

Figure 4:
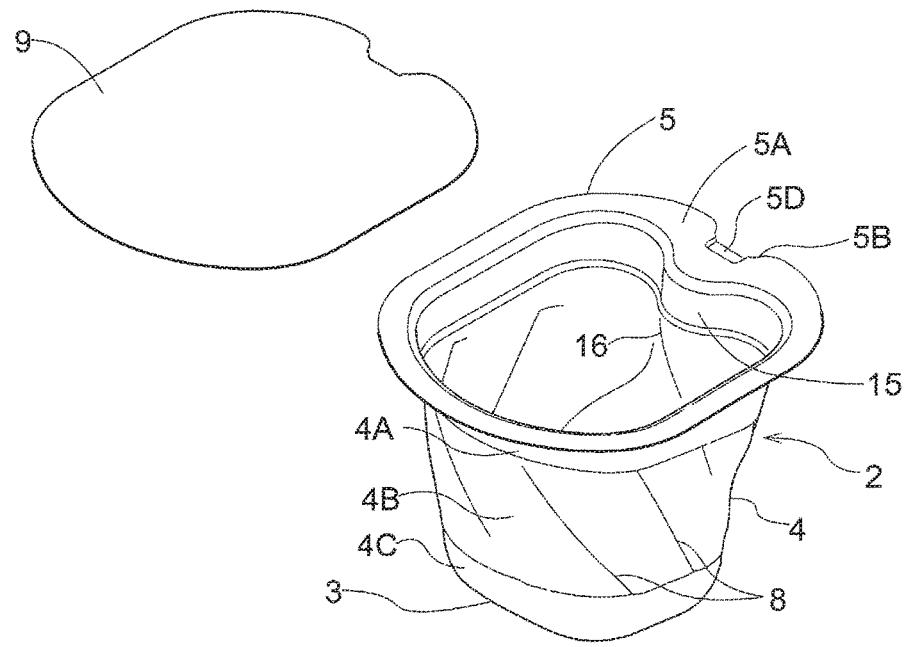
FIG. 4 is a section view showing a container body and a lid member of the container.

As shown in FIG. 1 and FIG. 4, at a portion of the flange 5 of the container body 2, there is formed an engaged sunk portion 5B sunk to the radially inner side (this engaged sunk portion 5B will appear as a "dent" in the outer shape of the flange 5 as seen in its plane view). And, at an area of the flanged face 5A corresponding to the engaged sunk portion 5B, there is formed an outflow groove 5D which is sunk toward the bottom face 3 and which is formed generally rectangular in the plane view (this outflow groove 5D will appear as a dent in the outer shape of the flange 5 as seen its front view or side view). This outflow groove 5D constitutes an outflow channel through which the contents C will flow upon exfoliation of the detaching seal portion 6S. The detaching seal portion 6S is disposed at an angular position corresponding to these members, i.e. the engaged sunk portion 5B and the outflow groove 5D as seen in the plane view.

Configuration of Dilution Bottle

Figure 2:
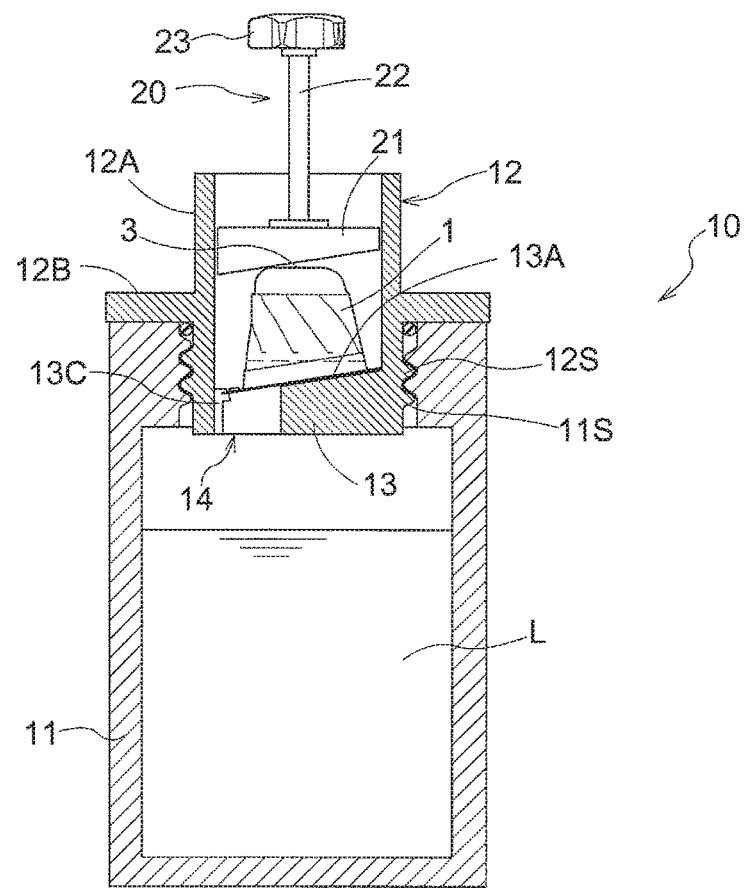
FIG. 2 is a section view showing the container as being set with a dilution bottle.
Figure 3:
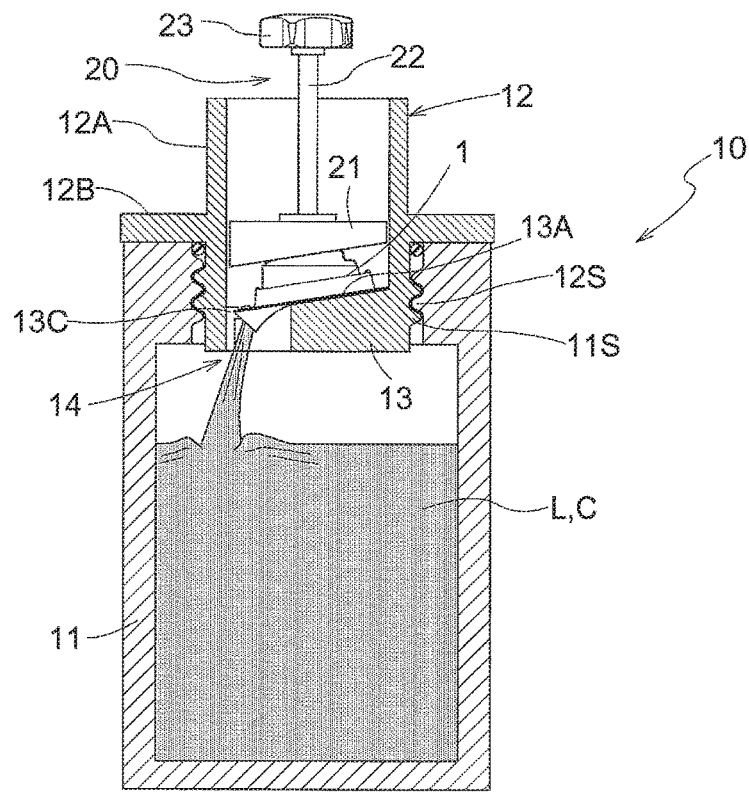
FIG. 3 is a section view showing the dilution bottle and the container which has been deformed and unsealed.

FIG. 2 shows an example of a bottle 10 that allows easy mixing of the contents C discharged from the portion container 1 with certain other liquid L or the like when used in combination with this portion container 1 and shows also the portion container 1 as being set to the bottle 10.

The bottle 10 shown in FIG. 2 includes a bottomed bottle body 11 having a relatively large capacity as compared with the portion container 1, an unsealing support member 12 provided at an upper portion of the bottle body 11, and a pressure applying member 20 supported to the inner face of the unsealing support member 12 to be vertically movable relative thereto.

The unsealing support member 12 includes a cylindrical portion 12A having an interior communicated to the interior of the bottle body 11 and a disc-shaped flange portion 12B extending radially outwards from a vertically intermediate position in the cylindrical portion 12A. The unsealing support member 12 is threaded to a female threaded portion 11S formed in an inner face of the opening of the bottle body 11 via a male thread 12S formed in the outer circumference of cylindrical portion 12A downwardly of the flange portion 12B.

Inside the cylindrical portion 12A, there is provided a container support portion 13, 13C for supporting the portion container 1 with the lid member 9 being oriented downwards.

The container support portion 13 includes a sloped face 13A which has a profile progressively decreased toward the opening 14 so as to establish communication between an upper inner space of the cylindrical portion 12A and the inside space of the bottle body 11.

The pressure applying member 20 includes a piston body 21 provided to be slidable relative to the inner face of the cylindrical portion 12A of the unsealing support portion 12, a bar-like support shaft 22 extending upwards from the upper face of the piston body 21, and a generally disc-like operational piece 23 attached to the upper end of the support shaft 22.

Figure 5:
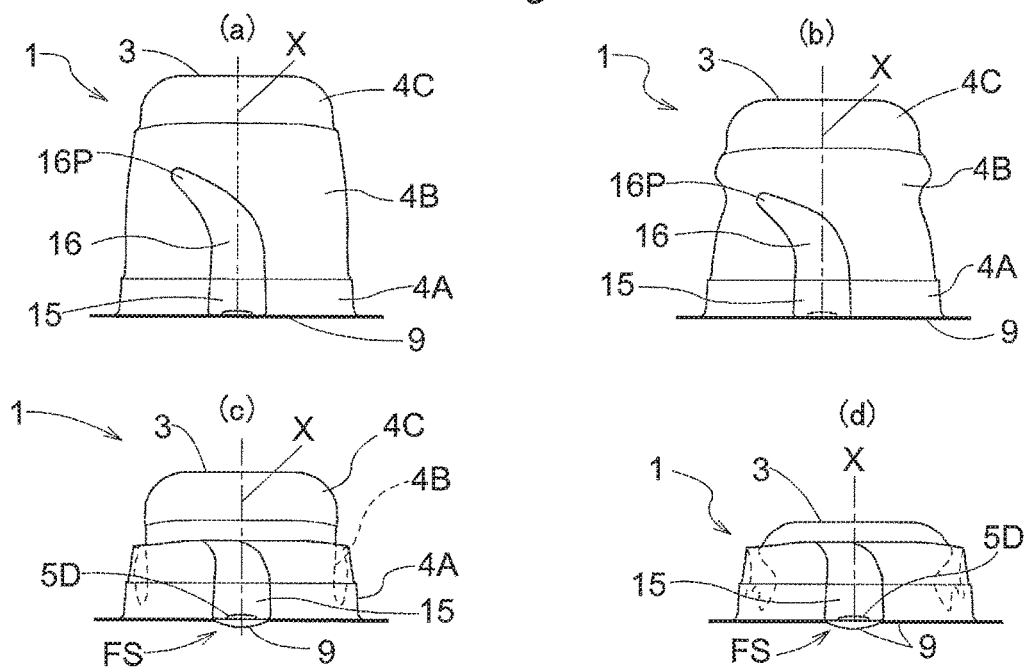
FIG. 5 is a plane view showing in (a)-(d) a deforming step of the container.

When the user progressively presses down the pressure applying member 20 via the operational piece 23 with the portion container 1 being placed on the sloped face 13A of the container support portion 13, as illustrated in FIG. 5, the container body 2 is deformed to cause the inside pressure of this container body 2 to rise to reach a critical value, so that the lid member 9 will tend to detach from the flanged face 5A in the vicinity of the detaching seal portion 6S. However, as the detaching seal portion 6S is placed under the state of facing the opening 14 from the above, the lid member 9 will be detached freely without being interfered by e.g. the sloped face 13A, so the unsealing operation can proceed smoothly.

When the pressure applying member 20 is pressed down farther, as illustrated in FIG. 5(d), there will occur vertically reducing deformation mainly in the side wall portion 4 of the container body 2, whereby most of the contents C will be discharged to the inside of the bottle body 11.

Detailed Configuration of Side Wall Portion

As shown in FIG. 4, the side wall portion 4 of the container body 2 comprises a cylindrical body whose diameter is progressively reduced toward the bottom face 3, and the side wall portion 4 includes a base end portion 4A extending from the back face of the flange 5 towards the bottom face 3, a leading end portion 4C extending from the bottom face 3 towards the flange 5, and an intermediate portion 4B interconnecting these base end portion 4A and leading end portion 4C.

The intermediate portion 4B is formed to obtain a smaller wall face thickness than the base end portion 4A and the leading end portion 4C, so that this intermediate portion 4B can be deformed more easily by an external force than the base end portion 4A and the leading end portion 4C. Incidentally, the arrangement for rendering the intermediate portion 4B more easily deformable than the two portions 4A, 4C can be provided by any other technique than the above, such as forming a folding line in the intermediate portion 4C alone.

Therefore, as the pressure applying member 20 is pressed down gradually via the operational piece 23 as described above, the deformation of the container body 2 will proceed with mainly the intermediate portion 4B having the smaller thickness in the side wall portion 4 collapsing.

FIG. 5 shows four states in sequence according to the sequence of deformation, from the initial state (a) in which the side wall portion 4 is not yet subject to any deformation to the state (d) in which the side wall portion 4 has been deformed sufficiently until most of the intermediate portion 4B advances into between the base end portion 4A and the leading end portion 4C.

In the instant embodiment, as illustrated in FIG. 5(a) in particular, there are provided small radially extending steps adjacent the boundary between the base end portion 4A and the intermediate portion 4B and adjacent the boundary between the intermediate portion 4B and the leading end portion 4C. At the positions of these steps, the intermediate portion 4B has a smaller diameter than the base end portion 4A and the leading end portion 4C has a smaller diameter than the intermediate portion 4B, respectively.

Therefore, when the vertical reduction deformation occurs with the collapsing deformation of the side wall portion 4, as illustrated in FIG. 5(d), deformation proceeds with a portion of the intermediate portion 4B entering the radial inner side of the base end portion 4A and with the leading end portion 4C entering the radial inner side of the intermediate portion 4B, respectively.

Further, in the instant embodiment, as illustrated in FIG. 5(a) etc., at a circumferential portion of the side wall portion 4, there is formed a sloped sunk portion 16 which has a progressively reduced width as it is displaced from the end of the intermediate portion 4B (the lower end of the intermediate portion 4B in FIG. 5) generally toward the bottom face 3 to one left or right side (the left side in FIG. 5) in the circumferential direction when the container body 2 assumes the posture of the lid member 9 being oriented downwards and which includes an upper end portion 16P adjacent the boundary between the intermediate portion 4B and the leading end portion 4C.

As shown in FIG. 4 and FIG. 5, at a position in the base end portion 4A on the radially inner side of the engaged sunk portion 5B, there is provided a base end sunk portion 15 which extends linearly along an axis X from the back face of the flanged face 5A toward the bottom face 3. This base end sunk portion 15 is sunk in the form of an arc projecting radially inwards as seen in the plane view, and the sloped sunk portion 16 extends continuously from an end portion of the base end sunk portion 15 (the upper end of the base end sunk portion 15 in FIG. 5) toward the bottom face 3.

Then, when a vertical stress is applied to the side wall portion 4 by e.g. the pressure applying member 20, the stress or distortion will be concentrated in the vicinity of the upper end 16P of the sloped sunk portion 16, so that the collapsing deformation of the side wall portion 4 will begin from the vicinity of this upper end 16P, as illustrated in FIG. 5(b).

The second view (b) in FIG. 5 illustrates a situation when the collapsing deformation of the side wall portion 4 has started at the portion of the sloped sunk portion 16 corresponding to the upper end 16P vicinity. When further vertical stress is applied thereto, a portion of the intermediate portion 4B will be bent radially inwards, thus realizing the state illustrated in the third view (c) in FIG. 5 in which it has advanced to the radially inner side of the base end portion 4A.

Next, when further vertical stress is applied from the state illustrated in FIG. 5(c), the bent portion of the intermediate portion 4B projecting downwards on the radial inner side of the base end portion 4A will move within the intermediate portion 4B gradually towards the bottom face 3 and approaching the flange 5 at the same time, thus realizing the state illustrated in the fourth view (d) in FIG. 5 in which the side wall portion 4 has been deformed sufficiently until most of the intermediate portion 4B has advanced into between the base end portion 4A and the leading end portion 4C.

Figure 7:
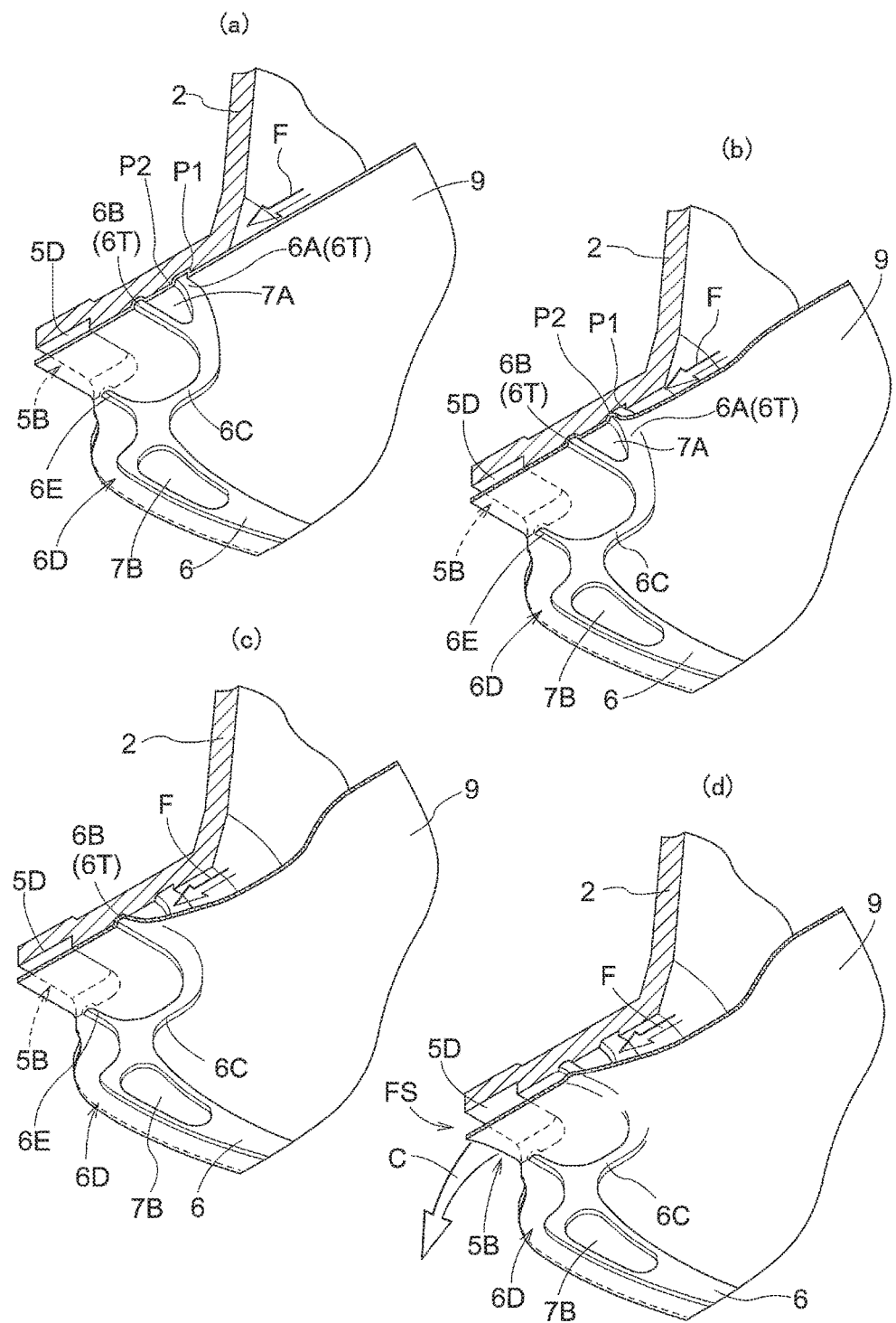
FIG. 7 is a perspective view illustrating in (a)-(d) a detaching step of a detaching seal portion.

In the course of the above, under the state illustrated in the third view (c) in FIG. 5 at the latest, the lid member 9 will be detached from the flange 5A only at the detaching seal portion 6S as illustrated in FIG. 7(d), so that unsealing is effected to allow start of discharge of the contents C from between the outflow groove 5D and the lid member 9. In this, between the outflow groove 5D and the back face of the detached lid member 9, as shown in FIG. 5 and FIG. 7, there will be formed a cylindrical outflow guiding space FS extending in the radial direction, so the contents C will be discharged in a stable manner as being guided by this cylindrical outflow guiding space.

Incidentally, in the intermediate portion 4B of the side wall portion 4, in order to prevent deformation by a shock during transportation for instance, there are formed a plurality of narrow line-like recesses 8 in the form of ribs arranged equidistantly and inclined along the same direction along the axis X, for the purpose of obtaining higher strength at thin-walled portion.

Detailed Configuration of Annular Seal Portion

Figure 6:
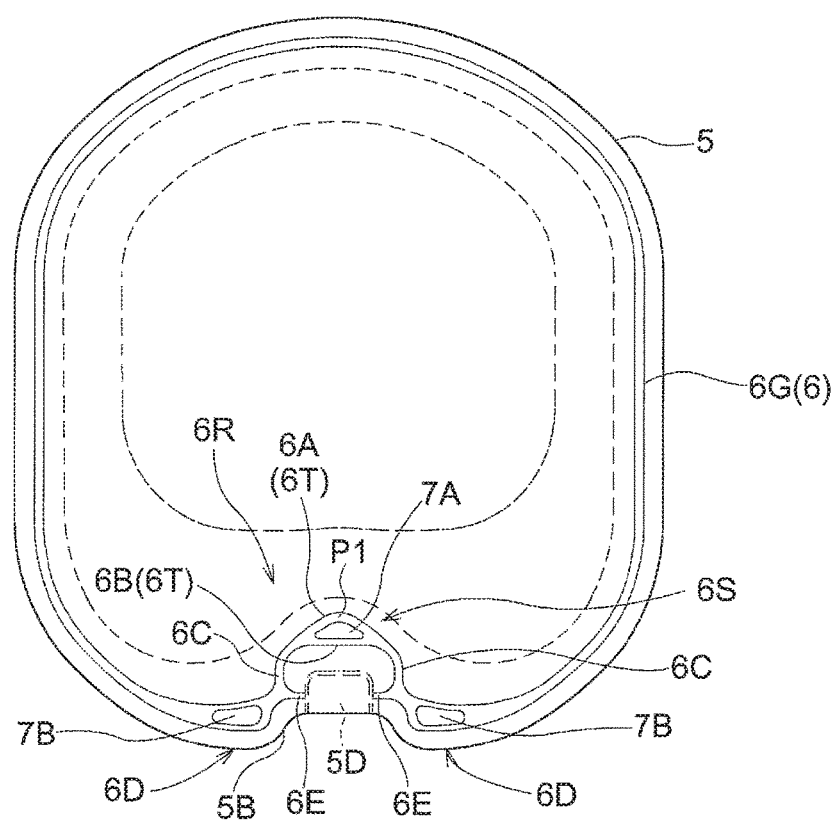
FIG. 6 is a plane view showing an annular seal portion.

As shown in FIG. 1 and FIG. 6, the annular seal portion 6 sealing between the container body 2 and the lid member 9 is configured such that rather than this seal portion 6 being face-fused and bonded across the entire width of the flanged face 5A over the entire circumference, the portion 6 is fused and bonded in the form of a line occupying only a portion of the width of the flanged face 5A.

More specifically, the annular seal portion 6, as shown in FIG. 6, includes a triangular seal portion 6T provided in the form of a triangle including a triangular first insular portion 7A at a position on the radial inner side of the engaged sunk portion 5B, an ordinary seal portion 6G formed longest in the form of a ring or a line projecting toward the radial outer side at the portion of the flanged face 5A excluding the engaged sunk portion 5B, a pair of left and right non-detaching seal portions 6D provided from the opposed ends of the ordinary seal portion 6G in such a manner to include a second insular portion 7B with an offset toward the engaged sunk portion 5B, and a pair of left and right connecting annular seal portions 6C connecting the triangular seal portion 6T and the non-detaching seal portions 6D.

Incidentally, in this detailed description, the term "insular portion" refers to a portion where the lid member 9 is not fused and bonded intentionally and partially to the flanged face 5A, but is left in the form of an island inside the bonded portion present in its surrounding.

Further, the annular seal portion 6 includes a pair of left and right auxiliary non-detaching seal portions 6E extending from the vicinity of the boundary between the non-detaching seal portions 6D and the connecting seal portion 6C to be disposed to face each other across the outflow groove 5D therebetween.

The triangular portion 6T only one which is provided and the non-detaching seal portions 6D two of which are provided exhibit an ring-shape including the first insular portion 7A and the second insular portion 7B therein, such that a secondary ring-like portion is included in a portion of the overall primary ring-like portion formed by the annular seal portion. Here, the "primary ring-like portion" refers to a single large seal portion extending to surround the entire opening of the container body 2, whereas the "secondary ring-like portion" refers to a small seal portion extending to surround the first insular portion 7A and the second insular portion 7B.

In the instant embodiment, the triangular seal portion 6T mainly constitutes the detaching seal portion 6S which can be detached more easily than the remaining portion of the annular seal portion 6 by increase of the inside pressure of the container body 2.

The triangular seal portion 6T is provided along the region corresponding to the radial inner side of the engaged sunk portion 5B in the flanged face 5A and exhibits as a whole a shape of an isosceles triangle projecting toward the radial inner side of the annular seal portion 6 in left-right symmetry.

In the triangular seal portion 6T, the two sides thereof located on the radial inner side of the above isosceles triangle, provide a reverse-oriented annular seal portion GA which is curved to project toward the radial inner side of the opening in the plane view, conversely from the ordinary seal portion 6G.

On the other hand, the one side corresponding to the base on the radial outer side of the isosceles triangle forms an auxiliary seal portion 6B which extends linearly to interconnect the opposed ends of the reverse-oriented seal portion 6A.

As a result of its geometric feature of being curved to project towards the radial inner side, in the event of increase of the inside pressure associated with deformation of the container body 2, a radially inwardly oriented leading end P1 of the reverse-oriented annular seal portion 6A (see FIG. 6 and FIG. 7) will be the portion where the inside pressure of the container body 2 is concentrated most in the annular seal portion 6, so that the reverse-oriented annular seal portion 6A serves as a detachment start portion where detachment of the lid member 9 starts with this inside pressure.

FIG. 7 shows four views arranged in accordance with progress of exfoliation (detachment), from the initial sate (a) when detachment of the lid member 9 or detachment of the annular seal portion 6 is not yet started to the state (d) when the detachment of the lid member 9 at the detaching seal portion 6S by the inside pressure F of the container body 2 has been completed.

The second view (b) in FIG. 7 illustrates a state when exfoliation of the lid member 9 has been started at the leading end P1 of the reverse-oriented annular seal portion 6A. The third view (c) in FIG. 7 illustrates a state when the exfoliation of the lid portion 9 has progressed over the entirety of the reverse-oriented annular seal portion 6A, but no exfoliation has occurred yet at the linear-shaped auxiliary detaching seal portion 6B.

As shown in the third view (c), after exfoliation of the reverse-oriented annular seal portion 6A, the inside pressure F of the container body 2 will be concentrated most at the auxiliary detaching seal portion 6B. So, exfoliation of the lid member 9 will proceed at this auxiliary detaching seal portion 6B with the inside pressure F.

As the result of progress of exfoliation of the lid member 9 at the auxiliary detaching seal portion 6B, as illustrated in (d) in FIG. 4, when at least a portion of the auxiliary detaching seal portion 6B has been detached, partial detachment of the annular seal portion 6 will be accomplished, whereby discharge of the contents C from the container body 2 will start.

Finally, as illustrated in the fourth view (d) in FIG. 7, when the exfoliation of the lid member 9 has occurred along the entire length of the linear-shaped auxiliary detaching seal portion 6B, in other words, when the exfoliation/unsealing has occurred only at the region of the triangular seal portion 6T constituting generally the detaching seal portion 6S, detachment of the annular seal portion 6 will be completed. Yet, a necessary outflow channel will be maintained to allow discharging of the contents C entirely at an appropriate rate.

Figure 8:
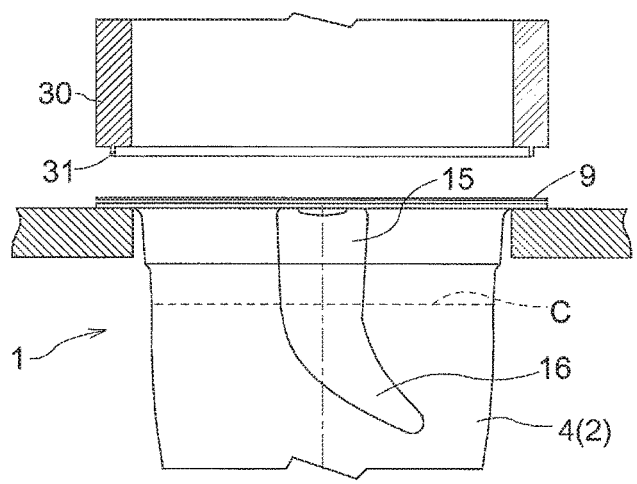
FIG. 8 is a section view illustrating a sealing step of an annular seal portion by a seal bar.

Incidentally, as illustrated in FIG. 8, the annular seal portion 6 is sealed by pressing the lid member 9 against the flanged face 5A of the container body 2 by a predetermined period (e.g. from 1 to a few seconds) be means of a hot seal bar 30 having an annular projection 31 having a shape corresponding to the shape of this annular seal portion 6 at its lower end.

Therefore, of a plurality of layers made of laminate films constituting the lid member 9, the lowermost layer contacting the flanged face 5A includes a heat seal layer (not shown) containing polyolefin-based resin having a function of being temporarily softened with application of heat and pressure from the seal bar 30, thus heat-fused and bonded to the flanged face 5A.

By the pressing of the seal bar 30, the lid member 9 will be fusedly bonded to the flanged face 5A with the heat seal layer at the portion corresponding to the annular projection 31 provided at the lower end of the seal bar 30. At the same time, a groove-like sunk portion corresponding to the annular projection 31 will be formed in the flanged face 5A.

As a result of research effort made in connection with the present invention, there was obtained a finding that in the cross sectional shape of the groove of the annular seal portion 6, the edge portions of the groove (the portions slightly raised on the opposed sides of the groove) show strongest bonding force. It was therefore found that in order to obtain a stronger bonding force, increase of the number of grooves is more effective than simply increasing the bonding area or increasing the width size of the groove to be formed by the seal bar 30.

Figure 9:
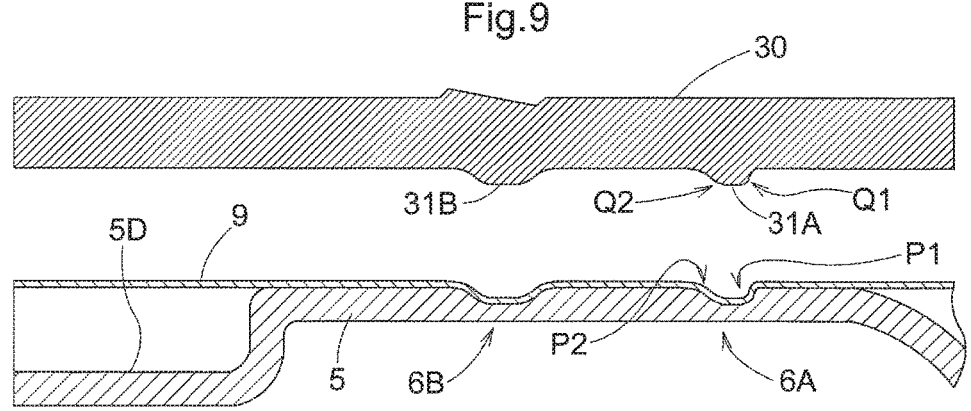
FIG. 9 is a section view showing the annular seal portion and an annular projection of the seal bar.

Further, although the cross sectional shape of the annular projection 31 is a significant factor that controls the bonding force of the annular seal 6, as illustrated in FIG. 9, respecting the annular projection 31 provided to form most of the annular seal portion 6 including the ordinary seal portion 6G, this projection 31 is provided with a shape having a same shape at its radially inner portion and its radially outer portion, that is, a left/right symmetric cross sectional shape.

Conversely, respecting an annular projection 31A provided to form the reverse-oriented annular seal portion 6A, its radially outer side portion (Q2 in FIG. 9) has a curvature radius substantially equal to that of the annular projection 31B provided to form the other auxiliary detaching seal portion 6B, but its radially inner side portion (Q1 in FIG. 9) is provided with a smaller curvature radius than the radially outer side portion Q2, thus provided with a special cross sectional shape non-right/left symmetric.

Therefore, as shown in the lower portion in FIG. 9, the cross section of the reverse-oriented annular seal portion 6A sealed by the annular projection 31A has a special shape with the radially inner portion being sunk to face the bottom face 3 at a more acute angle as compared with the radially outer portion. That is, the groove of the reverse-oriented annular seal portion 6A formed by the seal bar 30 constitutes an "uneven sealing force groove" where resistance against a detaching force applied from the radial inner side is distinctly smaller than resistance against a detaching force applied from the radial outer side. As a result, at the radially inner portion of the reverse-oriented annular seal portion 6A, exfoliation will occur with a lower inside pressure F as compared with the remaining portion of the annular seal portion 6, so that the above-described leading end P1 can function as the exfoliation start point reliably.

On the other hand, the portion (P2) located on the radially outer side of the reverse-oriented annular seal portion 6A has the standard cross sectional shape sunk to be oriented toward the bottom face 3 at the substantially equal angle to that of e.g. the auxiliary detaching seal portion 6B. Thus, inconvenience of inadvertent unsealing of the lid member 9 by an external force which may be applied in the course of transportation/distribution.

Next, the pair of left and right non-detaching seal portions 6D, as shown in FIG. 7, are disposed on the circumferentially outer sides relative to the outflow groove 5D, with two annular seal portions extending in the circumferential direction to surround the second insular portions 7B which respectively exhibit a streamline shape as seen in the plane view. In this way, in each detaching seal portion 6D, the two annular seal portions surrounding the second insular portion 7B are provided. This arrangement serves to double the number of the edge portions of the groove described above. As a result, at this portion, the lid member 9 is bonded with a bonding force which far exceeds the bonding force provided by the ordinary seal portion 6G comprised of a single annular seal portion. Further, the portion of the annular projection 31A sealing the non-detaching seal portion 6D has the ordinary left/right symmetric cross sectional shape having the curvature radius substantially equal to that of e.g. the auxiliary detaching seal portion 6B. Consequently, even when the rate of increase of the inside pressure of the container body 2 exceeds a generally expected range, the possibility of the detaching starting at the detaching seal portion 6S extending inadvertently to the non-detaching seal portion 6D is small.

The triangular seal portion 6T and each non-detaching seal portion 6D are connected to each other via the one of the left and right pair of connecting annular seal portions 6C. From the vicinity of the boundary between the non-detaching seal portions 6D and the connecting annular seal portions 6C, the pair of left and right auxiliary non-detaching seal portions 6E extend to the position immediately before the outflow groove 5D in such a manner to be disposed to face each other across this outflow groove 5D therebetween. Respecting the connecting annular seal portion 6C and the auxiliary non-detaching seal portion 6E, these seal portions 6C, 6E too have the ordinary left-right symmetric cross sectional shape with the curvature radius substantially equal to that of e.g. the auxiliary detaching seal portion 6B.

As illustrated in the last view (d) in FIG. 7, the pair of left and right auxiliary non-detaching seal portions 6E too will not be detached like the non-detaching seal portions 6D, and the auxiliary non-detaching seal portion 6E provides the function of limiting the width of the outflow channel to be formed by exfoliation of the lid member 9 below an expected value (agreeing to the width of the triangular seal portion 6T, that is, the length of the auxiliary detaching seal portion 6*b*).

Other Embodiments

Figure 10:
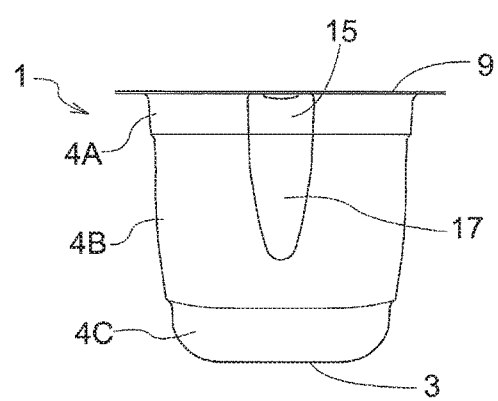
FIG. 10 is a section view showing a further embodiment of a deformation controlling recess.

<1> As illustrated in FIG. 10, instead of the sloped sunk portion 16, there may be provided a perpendicularly sunk portion 17 (an example of "deformation controlling recess") which extends with a progressively reduced width generally along the generating line of the side wall from the end portion of the base end sunk portion 15 (the lower end of the base end sunk portion 15 in FIG. 12) towards the bottom face 3. In this case too, similar effect to the effect provided by the sloped sunk portion 16 can be obtained.

Figure 11:
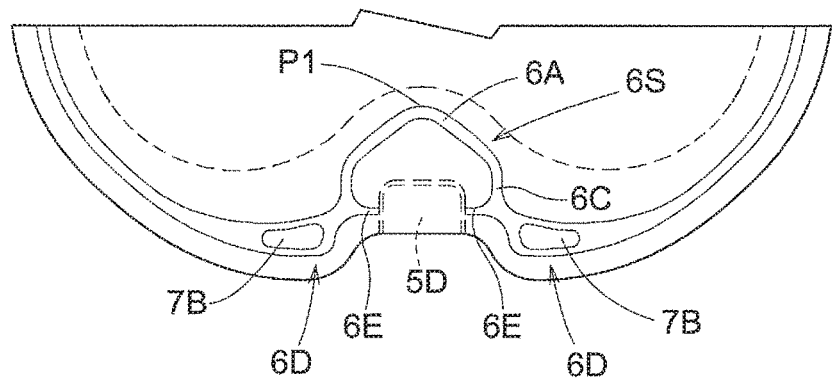
FIG. 11 is a plane view showing a further embodiment of the detaching seal portion.

<2> When there is less need to take into consideration the influence of external force such as in the course of distribution/transportation, as illustrated in FIG. 11, the detaching seal portion 6S can be alternatively embodied with omission of the auxiliary detaching seal portion 6B corresponding to the base of the isosceles triangle constituting the triangular seal portion 6T in the foregoing embodiment.

<3> In the foregoing embodiment, inside the triangular seal portion 6T, the first insular portion 7A as a non-seal portion was left. Instead, without leaving such first insular portion 7A inside the triangular seal portion 6T, the inner side of this triangular seal portion 6T may be sealed entirely.

Figure 12:
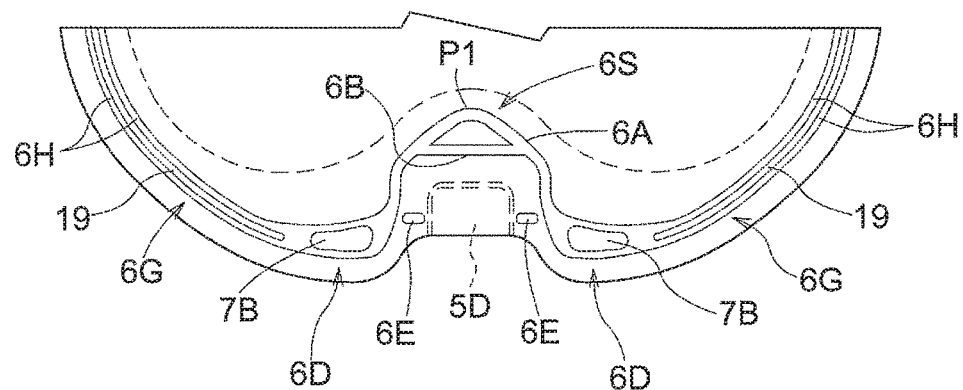
FIG. 12 is a plane view showing a further embodiment of the annular seal portion.

<4> The ordinary seal portion 6G other than the detaching seal portion 6S in the annular seal portion 6 can be provided, as illustrated in FIG. 12, with a multiple structure in which a plurality of line-like seal portions 6H are present on the radially inner and outer sides across long non-sealing portions 19. This arrangement can further increase the sealing strength of the ordinary seal portion 6G.

Figure 13:
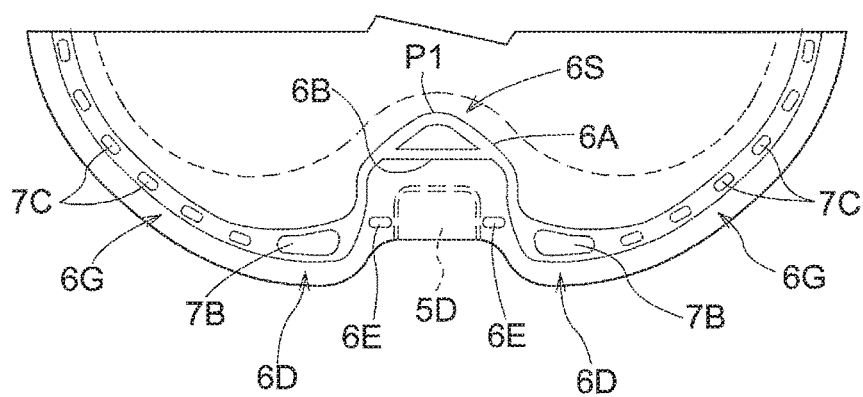
FIG. 13 is a plane view showing a still further embodiment of the annular seal portion.

<5> Or, as illustrated in FIG. 13, the sealing strength of the ordinary seal portion 6G can be further increased also by implementing a structure wherein the ordinary seal portion 6G is provided with a large radial width, inside of which many circular or oval-shaped insular non-sealing portions 7C are arranged along the circumferential direction.

<6> The contents to be held in the portion container is not limited to liquid, but can be e.g. mixture of powder and liquid, mixture of powder and gas, etc.

INDUSTRIAL APPLICABILITY

This invention is applicable as a technique to solve the problem conventionally found in a portion container including a container body holding contents therein and a lid member for closing an opening of the container body, the container body and the lid member being sealed by an annular seal portion formed along a flanged face of the opening.

DESCRIPTION OF REFERENCE MARKS/NUMERALS

1: portion container (container)
2: container body
3: bottom face
4: side wall portion
5: flange
5A: flanged face
5D: outflow groove
6: annular seal portion
6A: reverse-oriented annular seal portion
6C: connecting annular seal portion
6E: auxiliary non-detaching seal portion
6S: detaching seal portion
6T: triangular seal portion
9: lid member
16: sloped sunk portion (deformation controlling recess)
17: deformation controlling recess
C: contents
FS: cylindrical outflow guiding space
P1: leading end
X: axis

The invention claimed is:

1. A container including a bottomed container body holding contents therein and a lid member for closing an opening of the container body, the container body and the lid member being sealed with each other by an annular seal portion formed along a flanged face of the opening;
wherein at a specified portion of the annular seal portion, there is provided a detaching seal portion which is detached in response to increase of pressure inside the container body associated with deformation of the container body based on an external force received from a bottom face of the container body; and
at a portion of a side wall portion of the container body, there is provided a deformation controlling recess whose width is progressively reduced from a back face side of the flanged face toward the bottom face side;
the deformation controlling recess including a base end sunk portion extending from the back face of the flange toward the bottom face, and a sloped sunk portion extending continuously from an end of the base end sunk portion and having a width progressively reduced from the base end sunk portion toward the bottom face.

2. The container according to claim 1, wherein the side wall portion comprises a cylindrical body whose diameter is progressively reduced toward the bottom face.

3. The container according to claim 2, wherein:
the side wall portion includes a base end portion extending from the back face of the flanged face towards the bottom face, a leading end portion extending from the bottom face towards the back face, and an intermediate portion interconnecting the base end portion and the leading end portion and more deformable by the external force than the leading end portion and the base end portion; and
the deformation controlling recess extends at least from a portion of the intermediate portion to vicinity of boundary between the intermediate portion and the leading end portion.

4. The container according to claim 3, wherein the base end portion includes the base end sunk portion extending from the back face of the flanged face toward the bottom portion; and the deformation controlling recess extends continuously from a lower end of the base end sunk portion towards the bottom portion.

5. The container according to claim 4, wherein:
the annular seal portion includes a reverse-oriented annular seal portion projecting toward the radial inner side of the opening; and
the reverse-oriented annular seal portion extends along a region in the flanged face which corresponds to a radial outer side of an upper end of the base end sunk portion.

6. A container including a bottomed container body holding contents therein and a lid member for closing an opening of the container body, the container body and the lid member being sealed with each other by an annular seal portion formed along a flanged face of the opening;
wherein at a specified portion of the annular seal portion, there is provided a detaching seal portion which is detached in response to increase of pressure inside the container body associated with deformation of the container body based on an external force received from a bottom face of the container body; and
at a portion of a side wall portion of the container body, there is provided a deformation controlling recess whose width is progressively reduced from a back face side of the flanged face toward the bottom face side;
wherein the deformation controlling recess comprises a sloped sunk portion which is displaced to one side in the circumferential direction from the back face side of the flanged face towards the bottom face side.

* * * * *